UNITED STATES PATENT OFFICE.

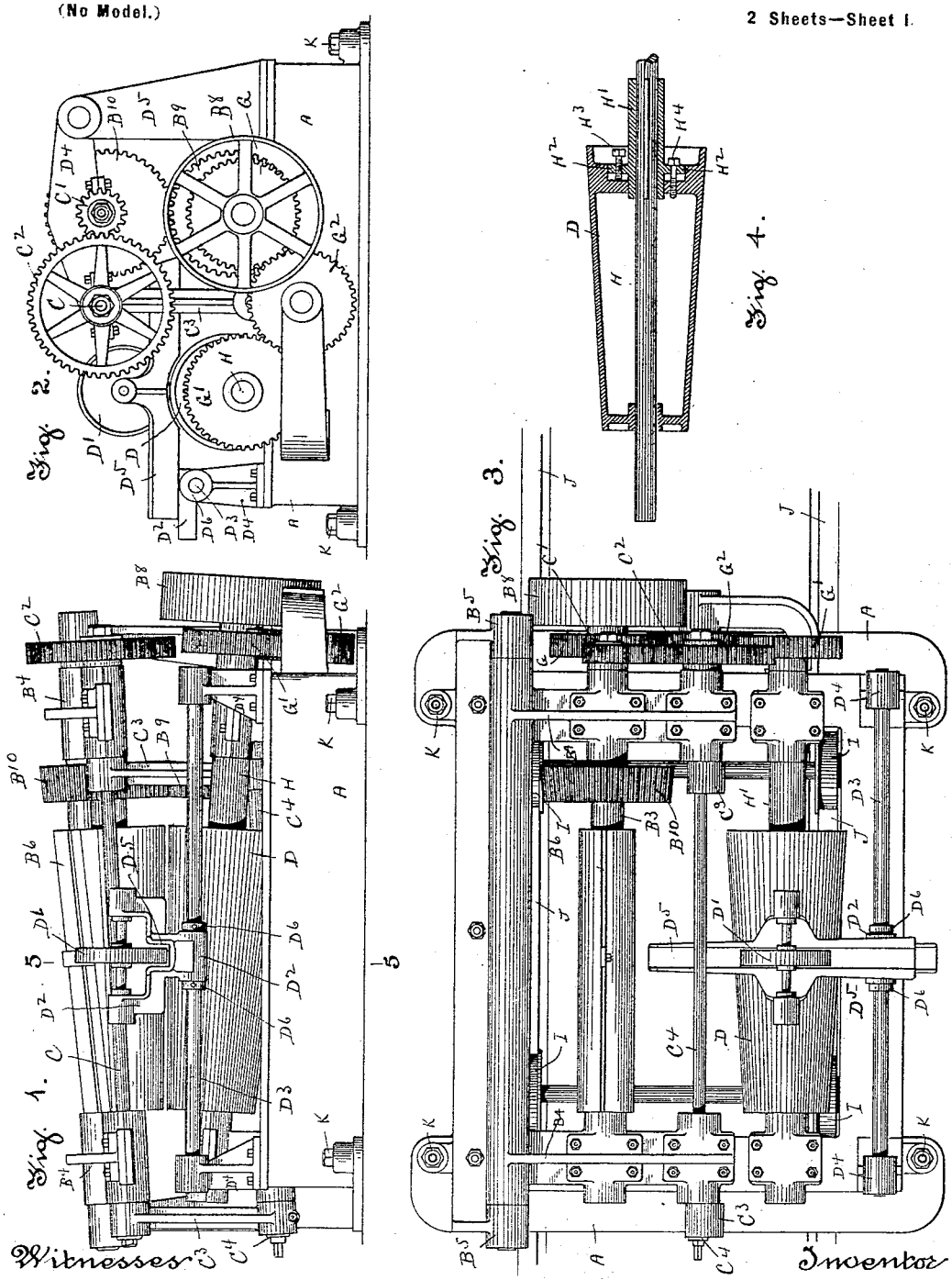

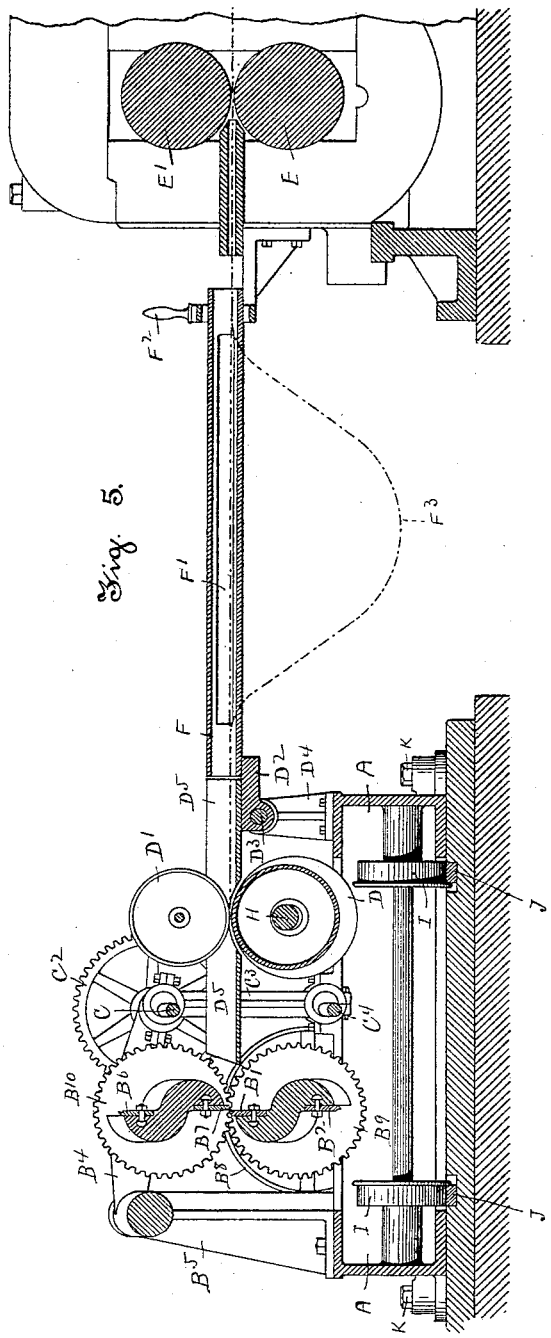

VICTOR E. EDWARDS, OF WORCESTER, MASSACHUSETTS, ASSIGNOR TO THE MORGAN CONSTRUCTION COMPANY, OF SAME PLACE.

METAL-CUTTING SHEARS.

SPECIFICATION forming part of Letters Patent No. 616,608, dated December 27, 1898.

Application filed June 18, 1897. Serial No. 641,304. (No model.)

*To all whom it may concern:*

Be it known that I, VICTOR E. EDWARDS, a citizen of the United States, residing at Worcester, in the county of Worcester and State of Massachusetts, have invented a new and useful Improvement in Metal-Cutting Shears, of which the following is a specification, accompanied by drawings forming a part of the same, in which—

Figure 1 is a side elevation of a metal-cutting shears embodying my invention. Fig. 2 is an end view. Fig. 3 is a top view. Fig. 4 is a longitudinal sectional view of the conical feed-roll; and Fig. 5 is a sectional view of the shears on line 5 5, Fig. 1, and also showing a sectional view of the delivery-rolls of a rolling-mill and a longitudinal central sectional view of the conductor by which a metal bar is conducted from the rolls to the shears.

Similar letters refer to similar parts in the different figures.

The object of my present invention is to provide a metal-cutting shears designed to cut a rod or bar as it is continuously delivered from the rolls of a rolling-mill into uniform and predetermined lengths, and I accomplish this result by means of mechanism as hereinafter described, and set forth in the annexed claims, said mechanism comprising means for severing the bar at stated periods, means for varying the period between the successive operations of the cutting mechanism, and means for varying the feed of the bar to the cutting mechanism.

Referring to the drawings, A denotes the framework upon which the operative parts of the machine are mounted. The cutting mechanism consists of a rotating shaft B, journaled in bearings on the framework A and carrying shear-blades $B'$ and $B^2$, with their cutting edges placed obliquely to their axis of rotation, so that the cutting edges as they revolve will describe the frustum of a cone; also, a revolving shaft $B^3$, journaled in a swinging frame $B^4$, pivoted to upright standards $B^5 B^5$ and carrying shear-blades $B^6 B^7$, arranged, like the shear-blades $B'$ and $B^2$, obliquely to their axis of rotation.

The lower shaft B is driven through a pulley $B^8$, and a uniform rotation is imparted to the upper shear-shaft $B^3$ by means of the gears $B^9$ and $B^{10}$, which are slightly beveled, as the shafts B and $B^3$ are placed at an oblique angle to each other in order to bring the cutting edges of the opposing shear-blades in contact. The swinging frame $B^4$, in which the upper shear-shaft $B^3$ is journaled, is provided with journal-bearings for a shaft C, which is driven from the upper shear-shaft $B^3$ by means of gears $C'$ and $C^2$. The shaft C is also journaled in the upper ends of links $C^3 C^3$, which are clamped at their lower ends upon a shaft $C^4$, capable of a rocking motion in the frame A.

That portion of the shaft C which passes through the ends of the links $C^3$ is eccentric to that portion of the shaft, which is journaled in the swinging frame $B^4$, so that the rotation of the shaft C will impart a rocking motion to the frame $B^4$, alternately raising and lowering the upper shear-shaft $B^3$. The shaft $C^4$, to which the lower ends of the links $C^3$ are clamped, has a rocking motion in the frame A, and that portion of the shaft to which the links are clamped is eccentric to the axis of the shaft, so that by loosening the links upon the shaft $C^4$ and slightly turning the shaft the links $C^3$ may be raised or lowered in order to adjust the contact between the upper and lower shear-blades. As the frame $B^4$ is raised by the rotation of the eccentric shaft C the shear-blades upon the upper shaft $B^3$ are carried out of action with the lower shear-blades, and when the rotation of the shaft C is timed by means of the driving-gears $C'$ and $C^2$ to produce the rising motion of the frame $B^4$ as a pair of opposing shear-blades are passing each other the cutting action is suspended and the bar passes between the shear-blades without being severed. The gears $C'$ and $C^2$ may be exchanged for those of different relative size, thereby allowing the rising-and-falling motion of the swinging frame $B^4$ to be varied relatively to the passage of the shear-blades.

The bar is fed to the revolving shear-blades by a feeding mechanism consisting of a conical roll D of equal length and taper with the shear-blades and a small weighted roll $D'$, supported in a framework $D^2$, which is pivoted upon a rod $D^3$, held in upright standards $D^4 D^4$, said frame comprising a trough $D^5$, by which the bar is conducted from the feeding mechanism to the shear-blades. Between the frame D² and the rolls E E' of the rolling-mill is a rocking tubular conveyer F, having in one side a slot or opening F'. The tubular conveyer F is rocked by means of the handle F² to raise the slot F' uppermost and provide a continuous bed along the tubular conveyer to conduct the bar from the rolls E E' to the feeding mechanism. When the bar has been caught between the conical roll D and the weighted roll D', the tubular conveyer F is rocked to bring the slot F' at the bottom, so that any slack occurring in the bar will cause it to fall through the slot F' in the form of a loop, (indicated by the broken line F³.)

The conical feed-roll D is driven from the lower shear-shaft B by means of the gears G and G' and the intermediate gear G². The frame D², which carries the weighted roll D', is held upon the shaft D³ between the collars D⁶ D⁶, allowing the trough D⁵ and weighted roll D' to be moved along the conical roll D in order to vary the speed of the rod as it is fed to the shears, the movement of the weighted roll D' and trough D⁵ toward the larger end of the conical roll D increasing and the movement toward the smaller end of the roll D decreasing the speed of the bar. The upper surface of the conical drum D is arranged in a horizontal plane and the shear-blades are also arranged so that the cutting action throughout their length takes place in the horizontal plane corresponding to that of the upper surface of the conical feed-roll D.

As the conical feed-roll D and the shear-blades are rotated at a constant speed the length of the severed bars can be increased or decreased by moving the trough D⁵ toward the smaller or larger end of the roll D. The length of the severed bars can also be varied by timing the rising motion of the swinging frame B⁴ so that each alternate pair of shear-blades, for example, may be lifted out of action, thereby causing the bar to be severed only once instead of twice during a complete revolution of the shafts B and B³.

The taper of the shears is the same as that of the conical roll D, so that the speed of the bar as it passes between the shear-blades will be just equal to the speed of the shear-blades, in order to prevent the buckling of the bar while it is engaged by the shear-blades, which would occur in case the bar traveled at a higher speed than the speed of the shear-blades, while if the shear-blades moved faster than the speed of the bar the bar would become stretched or drawn through the feed-rolls, thereby increasing the length of the severed piece.

In order to accurately adjust the speed of the surface of the conical roll D to the speed of that portion of the shear-blades directly opposite, I provide means for moving the conical roll longitudinally on its shaft H, so as to make the diameter of the roll just equal to the diameter of the circle described by the cutting edges of the shear-blades in the same vertical plane, said means consisting of a sleeve H', attached to the shaft H and having a flange H² holding the adjusting-screws H³ and H⁴, the screw H³ bearing against and the screw H⁴ entering the roll D⁴, so that an adjustment of the screws H³ and H⁴ will vary the position of the roll D longitudinally on the shaft H.

The operation of my improved metal-cutting shears is as follows: Having adjusted the conical feed-roll D on its shaft, as described above, the bar is conducted from the rolls E E' through the tubular conveyer to the trough D⁵ and between the weighted roll D' and the feed-roll D. The trough D⁵ is adjusted along the rod D³ to determine the speed of the bar as it is fed to the shear-blades, and the tubular conveyer rocked to carry its slot downward in order to allow any excess in the bar as delivered by the rolls E E' to fall in a loop, as shown by the broken line in Fig. 5. As the bar is fed between the shear-blades it is severed twice at each revolution of the shafts B and B³, each length of the bar being equal to half the periphery of the conical roll D at its contact with the bar. By adjusting the relative sizes of the gears C' and C² a rocking motion can be imparted to the frame B⁴ to cause the shear-blades to be raised out of contact at certain periods in order to cut bars of a multiple length.

The feed-roll can of course be carried upon the same shafts as the shear-blades; but I have shown what I consider the preferable form of construction. By employing a feeding mechanism which is independent of the speed of the rolls E E', I am not only able to vary the speed of the bar, but I obtain an accurate feeding movement which is not affected by the compression of the bar caused by the reducing-rolls E E'. The conical roll D and the weighted roll D' not only feed the bar forward to the shear-blades, but they also serve as measuring-rolls to determine the length of the bar which is fed forward during each revolution of the shear-blades.

The supporting-framework A is provided with truck-wheels I, adapted to run upon rails J, arranged at right angles to the trough D⁵ or the line of the feed of the bar to the rotary shears, in order to allow the frame A to be moved a distance at least equal to the length of the conical feed-roll D, which enables the trough D⁵ to be brought directly opposite the pass in the reducing-rolls E E', from which the bar is delivered. The adjustment of the trough D⁵ upon the rod D³ enables the bar to be fed by contact with that portion of the periphery of the conical roll which will give the required speed, and when the trough D⁵ has been properly adjusted relatively to the conical roll D the frame A is moved along the track J to bring the trough into alinement with the delivery-pass in the reducing-rolls, and the frame A is then securely held in position by the tightening-bolts K, allowing the bar to pass in a straight line from the reducing-rolls E E' to the rotary shears.

What I claim as my invention, and desire to secure by Letters Patent, is—

1. The combination with a pair of reducing-rolls by which a bar is reduced in diameter, of a cutting mechanism by which the bar is severed, and a feeding mechanism interposed between said reducing-rolls and said cutting mechanism consisting of a positively-driven feed-roll by which the speed of the bar delivered to the cutting mechanism is determined and a weighted roll rotated by its contact with the moving bar, substantially as described.

2. The combination with a pair of reducing-rolls by which the bar is reduced in diameter of a cutting mechanism, a feeding mechanism interposed between said reducing-rolls and said cutting mechanism consisting of a positively-driven roll by which the speed of the roll delivered to the cutting mechanism is determined, a weighted roll rotated by the movement of the bar, a conveyer by which the bar is supported as it leaves the reducing-rolls and as it enters the feeding mechanism, said conveyer having a slot between its supporting ends to provide for a loop in the bar, substantially as described.

3. The combination with a cutting mechanism of a feeding mechanism consisting of a positively-driven conical feed-roll, an opposing weighted roll between which a bar is fed, means for moving said weighted roll longitudinally to said conical feed-roll, and means for delivering the bar between said conical feed-roll and said weighted roll, substantially as described.

4. The combination with a cutting mechanism of a pair of feed-rolls, a trough by which a bar is conducted between said feed-rolls, said trough having a slot in its central portion, and said trough being capable of a rocking motion, whereby the slot is brought to one side to convey the advancing end of the bar to the feeding mechanism and to the under side of the trough to permit a downward loop to be formed by gravity, substantially as described.

5. The combination with a cutting mechanism, of a feeding mechanism consisting of a positively-driven conical feed-roll, an opposing weighted roll, a slotted trough by which a bar is conducted to said feed-rolls, means for rocking said trough to provide for a loop in said bar, and means for bringing said trough and opposing feed-rolls in alinement, substantially as described.

6. The combination with feeding mechanism, comprising a conical feed-roll and an opposing feed-roll, of a rotary shears having shear-blades placed at an oblique angle to their axis of rotation, substantially as described.

7. The combination with a feeding mechanism of a rotary shears having shear-blades placed at an oblique angle to their axis of rotation and means for adjusting said feeding mechanism whereby the position of the bar is changed relatively to said shear-blades, substantially as described.

8. The combination with a cutting mechanism consisting of a pair of shear-blades acting in opposition to each other at stated intervals, of means for periodically moving one of said shear-blades out of action whereby the cutting action of the blades is skipped, substantially as described.

9. The combination with a pair of shear-blades acting in opposition to each other, means for raising one of said blades out of contact with its opposing shear-blade at stated periods, whereby the normal length of the severed bar may be increased by multiple lengths, substantially as described.

10. The combination with a rotary shears having shear-blades placed at an oblique angle to their axis of rotation, whereby the speed of their cutting edges is gradually reduced from one end to the other, and a feeding mechanism whereby a bar is fed to said rotary shears at a speed corresponding to the speed of said cutting edges in the plane of the bar, substantially as described.

11. The combination with a rotary shears having shear-blades placed at an oblique angle to their axis of rotation, whereby the speed of their cutting edges is gradually reduced from one end to the other, of a feeding mechanism consisting of a positively-driven conical roll, an opposing weighted roll, and means for adjusting said weighted roll longitudinally to said conical feed-roll, substantially as described.

12. The combination with a rotary shears comprising shear-blades arranged in the plane of their axis of rotation and at an oblique angle thereto, of a conical feed-roll and an opposing feed-roll by which the bar is fed to said shears, substantially as described.

13. The combination with a pair of shear-blades acting in opposition to each other, of a swinging frame supporting one of said shear-blades, and means for rocking said frame at stated intervals, whereby said shear-blade is moved out of action with its opposing shear-blade, substantially as described.

14. The combination with a cutting mechanism of a feeding mechanism consisting of a positively-driven conical feed-roll, an opposing weighted roll, and means for adjusting it longitudinally to said conical feed-roll whereby the speed of the feeding mechanism relatively to the cutting mechanism is regulated, substantially as described.

15. The combination with a rotary shears consisting of a pair of rotating shear-blades placed at an oblique angle to their axis of rotation, whereby the speed of their cutting edges is gradually reduced from one end to the other, of a feeding mechanism consisting of a positively-driven conical feed-roll, means for longitudinally adjusting said feed-roll to said revolving shear-blades, an opposing weighted feed-roll, and means for adjusting said weighted roll longitudinally to said conical feed-roll, substantially as described.

16. The combination with two pairs of rolls of a conveyer by which a bar is conducted from one pair of rolls to the other, said conveyer consisting of a trough open on one side and having a slot in the central portion of the bottom of said trough to provide for a slack in the bar, and means for rocking said trough to guide the advancing end of the bar from one pair of rolls to the other, substantially as described.

17. The combination with a pair of reducing-rolls of a cutting mechanism consisting of a pair of revolving shear-blades placed at an oblique angle to their axis of rotation, whereby the speed of their cutting edges is gradually reduced from one end to the other, and means for adjusting said shear-blades parallel with their axes of rotation for the purpose of bringing the desired diameter of the rotating shear-blades opposite the pass in the reducing-rolls, substantially as described.

Dated this 10th day of June, 1897.

VICTOR E. EDWARDS.

Witnesses:
M. C. PRICE,
RUFUS B. FOWLER.